April 15, 1958 M. R. BLUME ET AL 2,830,686
SAFETY DEVICE AND SYSTEM
Filed May 12, 1955 4 Sheets-Sheet 1
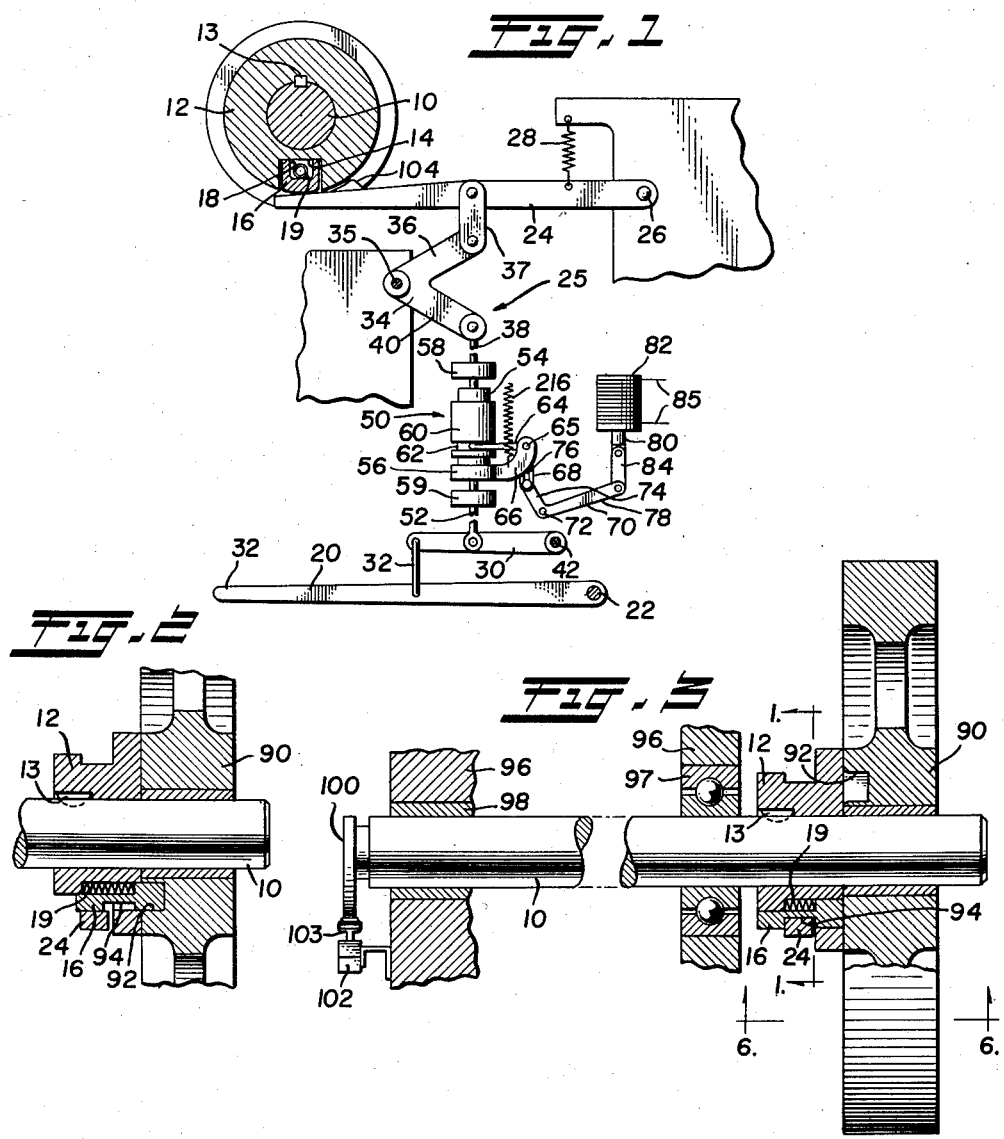
INVENTORS
MELVIN R. BLUME
RAYMOND J. HALICKI
BY
Fidler, Crouse & Beardsley
ATTORNEYS April 15, 1958 M. R. BLUME ET AL 2,830,686
SAFETY DEVICE AND SYSTEM
Filed May 12, 1955 4 Sheets-Sheet 2
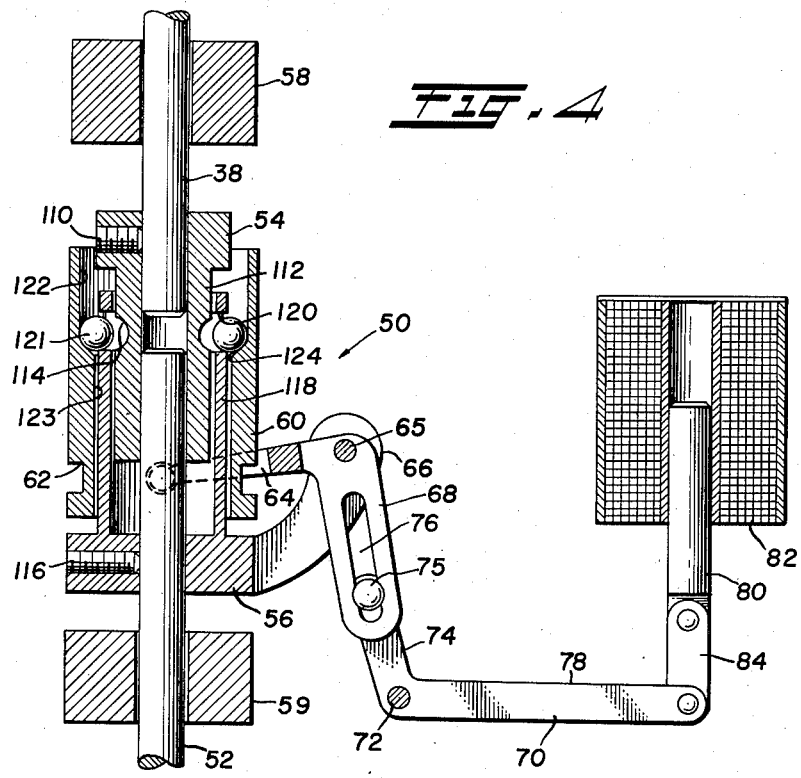
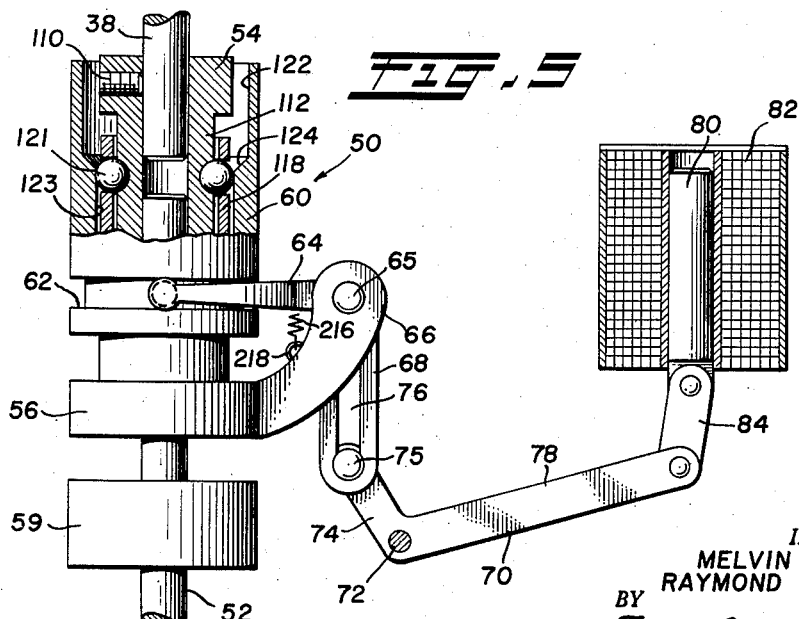
INVENTORS
MELVIN R. BLUME
RAYMOND J. HALICKI
BY
Fidler, Crouse & Beardsley
ATTORNEYS April 15, 1958    M. R. BLUME ET AL    2,830,686
SAFETY DEVICE AND SYSTEM
Filed May 12, 1955    4 Sheets-Sheet 3
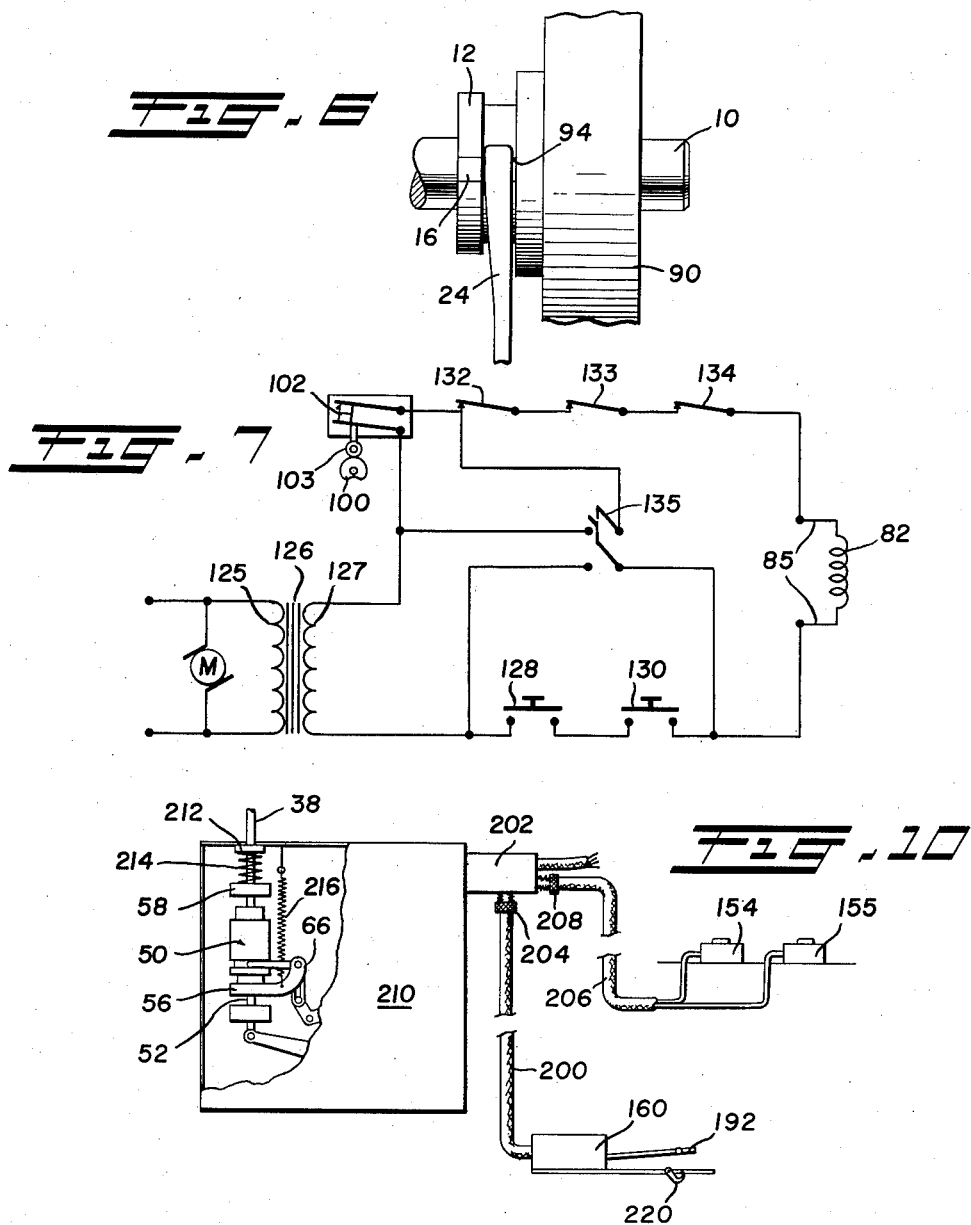
INVENTORS
MELVIN R. BLUME
RAYMOND J. HALICKI
BY
Fidler, Crouse & Beardsley
ATTORNEYS April 15, 1958     M. R. BLUME ET AL     2,830,686
SAFETY DEVICE AND SYSTEM
Filed May 12, 1955     4 Sheets-Sheet 4
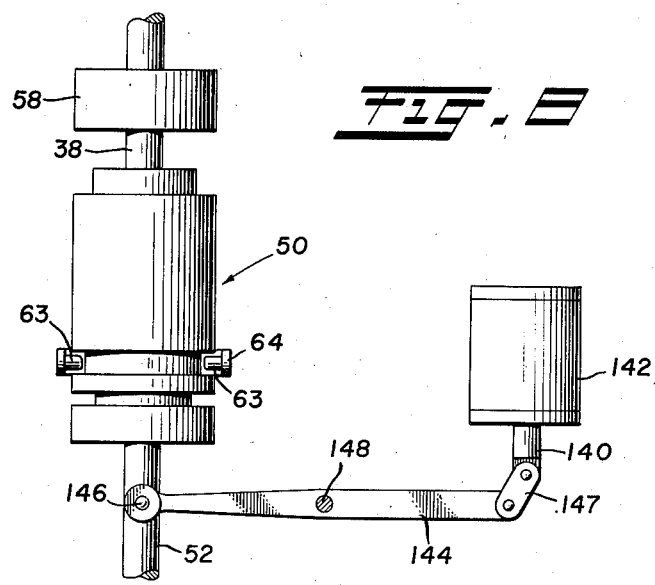
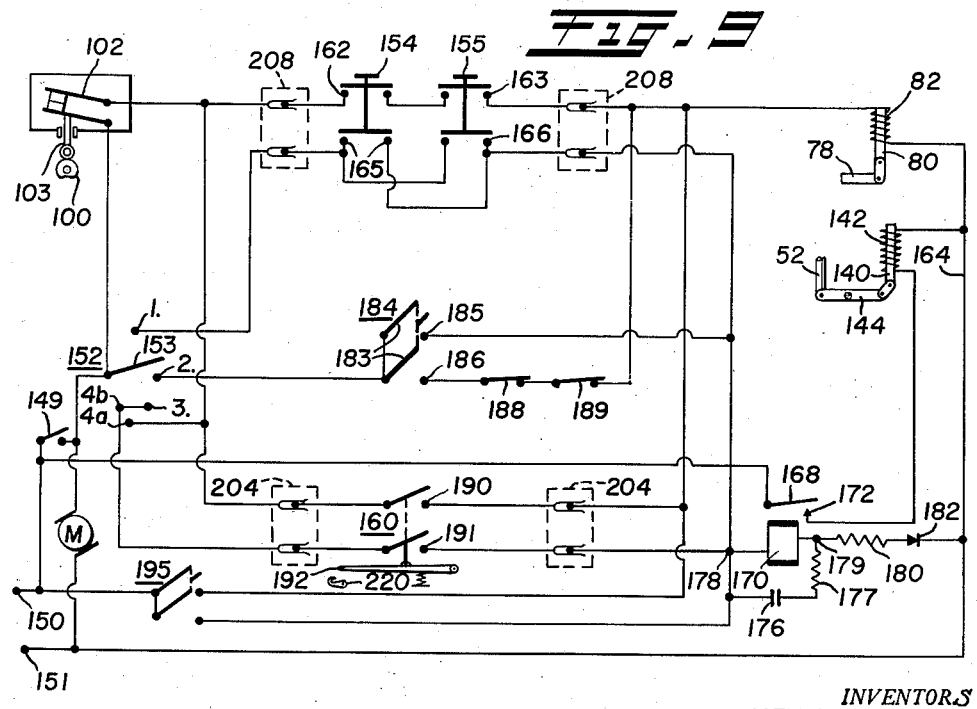
INVENTORS
MELVIN R. BLUME
RAYMOND J. HALICKI
BY
*Fidler, Crouse & Beardsley*
ATTORNEYS United States Patent Office 2,830,686
Patented Apr. 15, 1958

2,830,686

SAFETY DEVICE AND SYSTEM

Melvin R. Blume, Palatine, and Raymond J. Halicki, Chicago, Ill., assignors to Wisconsin Tool & Die Co., Chicago, Ill., a corporation of Illinois Application May 12, 1955, Serial No. 507,888

13 Claims. (Cl. 192—131)

The present invention relates generally to control devices for power machinery and more particularly to control devices for automatically effecting safe operation of such power machinery under all conditions.

It is generally customary to provide power machines such as punch presses, forming presses, power driven shears, etc., with a crosshead or ram arranged to reciprocate with respect to a bed plate, and actuated by a crank shaft coupled to a continuously rotating flywheel driven by an electric motor. Such machines are usually constructed with a single cycle clutch mechanism which, when actuated, will couple the crank shaft to the flywheel for a single revolution of the crank shaft. When the operator actuates the clutch control mechanism, which is usually in the form of a foot-operated treadle disposed near the base of the press and connected by an operating rod to the clutch mechanism, the clutch will be engaged to couple the crank shaft with the flywheel for a single cycle of operation to cause the crosshead or ram to go through a working stroke and automatically stop in open position.

The foot treadle control has, in the past, been the cause of frequent and often very serious accidents because operators tends to become careless and permit their fingers or hands to come into the path of the crosshead or ram when the latter is descending against the bed plate.

A great many attempts have been made in the past to develop safety devices that will prevent the operator's hands from getting into the path of the descending crosshead or ram, but most safety devices now in use are complex and expensive and often fail under certain circumstances, and are often rendered ineffective because operators, as a general rule, dislike any restrictions on their freedom of actions, and hence often purposely disable the safety devices or otherwise render the safety devices ineffective.

One of the most commonly used safety measures is to provide two spaced push buttons which both have to be closed, one by each hand of the operator, before the machine can be actuated. This type of safety device will not, however, prevent the clutch from being engaged when the clutch control mechanism is actuated while the machine is not energized or, for some reason, not in operating condition. When the machine fails to operate, the operator not realizing that the clutch has become engaged and that the machine is coupled to the motor, will attempt to discover the reason for the failure of the machine to function. If the operator should find the power switch open and close it, or should otherwise remove the fault which caused the machine to fail to operate, he is very likely inadvertently to place one of his hands or other part of his body in the path of the ram. With the clutch engaged, the ram will immediately descend when the machine is energized, and serious injury may be inflicted on the operator.

Operators often disable the double hand button safety device by tying down one of the buttons so that they can operate the machine under the control of the other button, leaving one hand free to manipulate the work piece. Of course, this will render the safety device ineffective to prevent the free hand from coming into the path of the ram of the machine. It is contemplated by the present invention to provide safety devices which are not subject to the deficiencies and limitations of the types of safety devices discussed above.

A general object of the present invention is therefore to provide a novel safety device for preventing inadvertent and unsafe operation of power machinery.

Another object of the invention is to provide a novel and simple safety device which can readily be installed on existing power machinery to operate in conjunction with conventional safety devices.

Another object of the invention is to provide a novel safety system energized from the same source as the motor of the machine to disable the machine controls when the motor is not supplied with power.

Another object of the invention is to provide a novel and simple safety device connected in circuit with two spaced, hand-controlled switches so as to disable the clutch actuating mechanism when the machine is not in operating condition.

Another object is to provide a novel and simple safety device for use in conjunction with safety devices that employ two spaced, hand-controlled push buttons for preventing the actuating mechanism from being operated, unless both buttons are operated within a predetermined period of time.

Another object is to provide a novel disconnect device for the operating rod of power machines for disabling the rod during certain phases of the operation of the machine.

Another object is to provide a novel disconnect device for coupling together the adjacent ends of a broken actuating rod of a power machine and adapted to disable the actuating mechanism during certain phases of the operation of the machine.

Another object of the invention is to provide a novel safety device that "fails safe."

Another object is to provide a safety device that will "fail safe" upon any failure of the mechanical or electrical system of the machine or upon any failure of the power supplied thereto.

Still another object is to provide a safety device which can be set for operation of a power machine either under hand control or foot control, or continuously.

Still another object is to provide a device which provides single cycle operation even if the operator fails to release the operating treadle or switch until the machine has completed a cycle of operation.

These and other objects and advantages of the invention will be apparent from the following description of certain embodiments thereof as illustrated in the accompanying drawings wherein:

Fig. 1 is a schematic diagram of a control mechanism of a power machine embodying the present invention;

Fig. 2 is a cross-sectional fragmentary view showing the clutch for the machine in engaged position;

Fig. 3 is a cross-sectional view, with portions removed, through the clutch in disengaged position and through the journaling means for the crank shaft of the machine;

Fig. 4 is a cross-sectional view of a disconnect device in accordance with the invention in released condition;

Fig. 5 is an elevational view, with portions broken away, of the disconnect device in locked condition;

Fig. 6 is a fragmentary view showing a portion of the clutch actuating lever;

Fig. 7 is a circuit diagram illustrating the manner in which the safety device is connected in the motor control circuit;

Fig. 8 is an elevational view of the disconnect device including electrically operated means for actuating the operating rod;

Fig. 9 is a circuit diagram of a motor control system in accordance with another feature of the invention; and Fig. 10 is a schematic diagram of an enclosure for the disconnect device and the solenoid for actuating the operating rod and shows cable connections to a foot-operated switch and a pair of hand-operated switches.

For a better understanding of our invention, we will first describe a typical clutch actuating mechanism for a power machine with which our safety device is particularly well adapted, referring particularly to Figs. 1 to 3 and 6. Fig. 1 shows a cross sectional view through a clutch drum 12 mounted on a crank shaft 10 and keyed thereto by means of a key 13. The clutch drum is provided with a longitudinal rectangular cut or channel 14 for receiving a reciprocable clutch pin 16. The clutch pin 16 is provided with a recess 18 for receiving a biasing spring 19. The clutch pin 16 is operated by a foot treadle 20 pivotally mounted about a pivot pin 22 for moving a clutch lever 24 downwardly, when depressed, through a linking mechanism generally indicated at 25. The clutch lever 24 is pivotally mounted about a pivot pin 26 and is biased towards engagement with the clutch by means of a tension spring 28. A bell crank 34 is pivotally connected to the frame of the machine by means of a pivot pin 35 and has one arm 36 thereof connected to an intermediate point on the clutch lever 24 through a connecting link 37, and the other arm 40 connected to one end of an operating rod 38. The foot treadle 20 is connected to an intermediate lever 30 through an operating link 32 connecting the extreme end of the intermediate lever 30 to the treadle 20 at a point between the pivot point 22 and the foot pedal 32. The operating mechanism so far described is conventional and forms no part of the present invention, but is included herein in order that the nature of the invention may be more fully understood.

In machinery of the general type referred to herein, an operating rod 38 is usually provided which connects the lower arm 40 of the bell crank 34 directly to the intermediate lever 30 at a point between the pivot point 42 of the latter and the link 32. In accordance with the present invention, a disconnect device, generally indicated at 50 and shown in detail in Figs. 4 and 5, is provided that connects together an operating rod portion 52 which is pivotally connected to the lever 30 and the rod portion 38 which is pivotally connected to the arm 40 of the bell crank 34. A coupling 54 connects one end of the disconnect device 50 to the rod portion 38, and a coupling 56 connects the other end of the disconnect device to the rod portion 52. Stationary members 58 and 59 slidably receive the respective rod portions 38 and 52 and serve to guide the movements thereof. The disconnect device 50 includes a sliding locking sleeve 60 provided with a circumferential groove 62 for receiving actuating rollers 63 (Fig. 8) mounted inside the opposite ends of an actuating clevis member 64 mounted for pivotal movement about a pivot pin 65 on an arcuate upwardly extending pivot support 66 integral with the coupling member 56. The clevis 64 is provided with an integral arm 68 that extends downwardly therefrom substantially parallel with the direction of movement of the rod portions 38 and 52. A bell crank 70 is mounted on the machine frame for pivotal movement about a stationary pivot pin 72. One arm 74 of the bell crank 70 carries a pin 75 which is slidably received within a slot 76 in the arm 68 of the clevis member 64. The other arm 78 of the bell crank 70 is connected to the armature 80 of a solenoid 82 through a link 84. The linkage mechanism between the armature 80 and the clevis member 64 is shown in Figs. 1 and 4 in the position it takes when the solenoid 82 is deenergized and when the disconnect device 50 is in disconnect condition. When the solenoid 82 is energized by the application of electric power to the input leads 85 thereof, the armature 80 will be displaced upwardly, thereby rotating the bell crank 70 in a counterclockwise direction about the pivot point 72 through the connecting link 84. Rotational movement of the bell crank 70 will, through its slot and pin connection with the clevis member 64 rotate the latter in a clockwise direction about its pivot point 65 to thereby cause the clevis member 64 to displace the locking sleeve 60 of the disconnect device 50 upwardly and into locking position as shown in Fig. 5. When the solenoid 82 is again deenergized, the linkage between the armature 80 and the clevis member 64 will assume the position shown in Fig. 4 and will cause the locking sleeve 60 to slide downwardly into a non-locking position. It will be apparent from the above description that the foot treadle 20 is effectively disconnected from the rod portion 38 and the clutch release member 24 when the solenoid 82 is deenergized and the disconnect device is in the disconnect condition shown in Fig. 4. When the solenoid 82 is energized so as to maintain the disconnect device 50 in locked condition (Fig. 5), the rod portions 52 and 38 will be locked together and downward movement of the foot treadle 20 will be transmitted to the bell crank 34 to rotate the latter in a clockwise direction about the pivot point 35. The bell crank 40 will in turn displace the clutch operating lever 24 downwardly through the connecting link 37 to engage the clutch in a manner to be presently described.

Fig. 2 shows the clutch drum 12 and the hub portion of a flywheel 90 which is rotatably mounted on the crank shaft 10, locked together through the released clutch pin 16 extending into a recess 92 in the face of the flywheel. The clutch pin 16 is forced into the recess 92 by the compression spring 19 which is seated against the clutch drum 12.

Fig. 3 shows the position of the clutch in disengaged position with the clutch pin 16 maintained retracted from the recess 92 in the flywheel 90 by the clutch lever 24 which is seated within a transverse recess 94 in the clutch pin and thus prevents the clutch pin from moving to the right as viewed in Fig. 3 under the compulsion of the spring 19. The crank shaft 10 is shown journaled for rotation in the machine housing 96 by means of roller bearings 97 and a sleeve bearing 98. A cam member 100 is rigidly secured to one end of the crank shaft 10 so as to rotate therewith. A non-repeat switch 102 is mounted on the frame 96 of the machine and is provided with a contact controlling plunger 103 which is normally held depressed by the cam 100 to maintain the switch closed. The cam member 100 will momentarily release the plunger 103 and open the switch 102 when the crank shaft 10 nears completion of one revolution from its initial starting point. The manner in which the switch 102 is connected in the operating circuit of the machine will be described in connection with Figs. 7 and 9.

The clutch operating lever 24 tapers in its width dimension from the end toward its pivot point as shown in Fig. 6, and is provided with a clutch pin engaging knife 104 which enters the recess 94 in the clutch pin 16 as the clutch drum nears the completion of one revolution. As the clutch drum completes one revolution, the gradually widening end of the clutch lever 24 will enter the recess 94 in the clutch pin 16 and cam the clutch pin away from the flywheel 90 and out of the recess 92. When the clutch drum 12 reaches the position shown in Fig. 1, the clutch pin 16 will be fully withdrawn from the recess 92 in the flywheel 90, and the crank shaft 10 will be disconnected therefrom. The flywheel 90 will continue to rotate on the crank shaft 10, but the clutch drum 12 will remain disengaged therefrom as long as the clutch lever 24 remains in the position shown in Fig. 3 in the recess 94 of the clutch pin 16. The construction and operation of the flywheel and the clutch mechanism are described herein only by way of example, and other types of clutch mechanisms can, of course, be employed.

The disconnect device 50 will now be described with particular reference to Fig. 4. The coupling 54 is rigidly secured to the rod portion 38 by means of one or more set screws 110. The coupling member 54 is formed with a reduced diameter cylindrical sleeve or shank portion 112 which extends beyond the end of the rod portion 38 so as to slidably receive the end of the rod portion 52. The shank portion 112 of the coupling member 54 is provided with a circumferential ball receiving groove 114 of semicircular cross section.

The coupling member 56 is similarly rigidly secured to the rod portion 52 by means of one or more set screws 116. The coupling member 56 is formed with an upwardly extending sleeve member 118 which slidably receives the shank portion 112 of the coupling member 54 and extends to a point beyond the annular groove 114 in the latter when the rod portions 38 and 52 are in the positions they will assume when the clutch actuating mechanism is in the condition illustrated in Fig. 1; that is, with the clutch pin 16 out of engagement with the flywheel and with the foot treadle in its non-operated position.

The sleeve member 118 is provided with a plurality of ball retaining openings 120 and serves as a ball cage for a plurality of locking balls 121. In the normal position shown in Fig. 4, the ball retaining openings 120 are aligned with the groove 114 in the sleeve portion 112 of the coupling member 54. The locking sleeve 60 is slidably mounted on the cage sleeve 118 of the coupling member 56. The upper bore portion 122 of the locking sleeve 60 is of such diameter as to allow the balls 121 to withdraw completely from the groove 114 to permit unrestricted relative movements between the rod portion 38 which carries the sleeve member 112 and the rod portion 52 which carries the cage sleeve 118 and the locking sleeve 60. The lower bore portion 123 of the locking sleeve 60 is only slightly larger than the ball cage sleeve 118 and is connected to the bore portion 122 by an inclined cam surface 124. When the locking sleeve is moved upwardly from the position shown in Fig. 4, the cam surface 124 will force the balls 121 inwardly into the groove 114 in the sleeve member 112 to assume the locked position shown in Fig. 5, wherein the balls form a rigid connection between the ball cage sleeve 118 and the sleeve member 112. The ball locking sleeve 60 is moved to the locking position shown in Fig. 5 when the solenoid 82 is energized to displace the armature 80 upwardly and thereby rotate the bell crank 70 counterclockwise and the clevis member 64 clockwise as described above. It will be apparent from the above description of the disconnect device 50 that the rod portions 38 and 52 are free to move independently of each other when the solenoid 82 is deenergized and the sliding locking sleeve 60 is in the position shown in Fig. 4, and that the rod portions 38 and 52 are rigidly connected together when the solenoid 82 is energized and the sliding locking sleeve 60 is in the locking position shown in Fig. 5.

Fig. 7 illustrates the manner in which the solenoid 82 is connected in the control circuit of a machine. The primary winding 125 of a transformer 126 is energized from the same source of electric power as the electric motor M that drives the flywheel 90. The secondary winding 127 of the transformer 126 is connected across the input terminals 85 of the solenoid 82 through a series of circuit control switches, namely, a pair of hand-operated, normally open push button switches 128 and 130 connected in series between one side of the secondary winding and one input lead of the solenoid, and three safety switches 132, 133 and 134 connected in series with each other and with the non-repeat switch 102 between the other side of the secondary winding 127 and the other input lead of the solenoid. The switches 132, 133 and 134 may be the conventional stock buckle switch, pilot switch and empty switch, respectively, which are representative of a series of such switches normally provided in order to disable the machine in the event of any one of a plurality of fault conditions arising in the operation of the machine. During normal operation of the machine the switches 132, 133 and 134 are closed, and in the initial position of the crank shaft 10 the cam 100 will maintain the switch operating plunger 103 depressed and the switch 102 closed. It will thus be seen that as long as the transformer 126 is energized and no fault condition exists, the solenoid 82 will be under the control of the two push button switches 128 and 130. A double-pole, single-throw switch 135 is provided for shorting out the non-repeat switch 102 and the two series-connected push button switches 128 and 130 for continuous operation of the machine, when desired.

Fig. 8 illustrates a further embodiment of the invention wherein the clutch operating rod 52 can be operated either by a mechanical foot treadle or electrically. To this end the rod portion 52 is connected to the armature 140 of an operating solenoid 142 by means of a lever 144 pivotally mounted on the machine frame about a pivot pin 148 and connected to the rod portion 52 by a pin 146 and to the armature 140 by a link 147. It will be appreciated that the machine can be operated either by the conventional foot treadle connected to the rod portion 52 in a manner similar to that shown in Fig. 1, or by selectively energizing the solenoid 142. When the solenoid 142 is energized, the armature 140 will be displaced upwardly as shown in Fig. 8 to move the rod portion 52 downwardly through the lever 144. In many instances it is desirable to operate the machine exclusively by the soelnoid 142, and in such cases the rod portion 52 may be terminated just below the pin 146.

Fig. 9 shows a control circuit for a power machine whereby the machine may be operated selectively under the control of hand buttons, continuously, or under the control of a foot operated switch. The operating power, which may be derived from a transformer similar to the transformer 126 of Fig. 7, is applied across a pair of input terminals 150 and 151. A main circuit switch 149 is provided for connecting power to the motor M and the control circuit shown. A multipoint selector switch 152 having a movable switch arm 153 that can be selectively positioned on any one of a plurality of contact positions 1, 2, 3 and 4 is provided for selecting the manner in which it is desired to control the machine. When the switch arm 153 is in contact position 1, the circuit will be connected to operate the machine under the control of a pair of push button switches 154 and 155; when in contact position 2, the circuit will be connected to operate the machine continuously under the control of a switch 184; when in contact position 3, the circuit will be connected to operate the machine under the control of a foot-operated double-pole, single-throw switch 160; and when in contact position 4, the circuit will be connected to operate the machine continuously under the control of the foot-operated switch 160.

The push button switches 154 and 155 are of a double-pole, single-throw type. Contacts 162 of the switch 154 and contacts 163 of the switch 155 are connected in series with each other and with the non-repeat switch 102 to connect one side of the winding 4 of the solenoid 82 to the line terminal 150. The other side of the winding of the solenoid 82 is connected to the return line 164 which is in turn connected to the other line terminal 151. Contacts 165 and 166 of push button switches 154 and 155, respectively, are connected in parallel between the contact 1 of the selector switch 152 and the terminal 178 of a relay 170. The front contact 172 of the relay 170 is connected to one side of the winding of the solenoid 142. The other side of the winding of the solenoid 142 is connected to the return line 164. A capacitor 176 and a resistor 177 are connected in series across the terminals 178 and 179 of the operating winding of the relay 170. The armature 168 of the relay 170 is connected directly to the input terminal 150 so that it is energized as long as power is supplied to the terminals 150, 151. The terminal 179 of the relay 170 is connected to the return line 164 through a current limiting resistance 180 and a rectifier 182.

The two contact blades 183 of the double-pole, single-throw, continuous-operation switch 184 are connected to the contact 2 of the selector switch 152. One contact 185 of the switch 184 is connected to the terminal 178 of the relay 170 and the other contact 186 of the switch is connected to the winding of the solenoid 82 through a plurality of series connected switches, such as a stock run-out switch 188 and a buckle switch 189, for example.

One set of contacts 190 of the foot-operated double-pole, single-throw switch 160 is connected between the winding of the solenoid 82, and the stationary contact of the non-repeat switch 102 and the contact 4a of the selector switch 152. The other set of contacts 191 of the foot-operated switch 160 is connected between the contacts 3 and 4b of the selector switch 152, and the terminal 178 of the relay 170.

In setting up a machine of the general type referred to herein, it is often necessary to "inch" the machine along and to stop it in positions other than its normal rest position. For this purpose, there is provided a double-pole, single-throw inching switch 195. The switch blades of the switch 195 are connected directly to the line contact 150 and the two contacts thereof are connected, respectively, to the winding of the solenoid 82 and to the terminal 178 of the relay 170. Thus, by closing the switch 195 the clutch is tripped while the motor M of the machine is not running. The machine can now be inched along either by turning the flywheel by hand or by momentarily closing the switch 149 and momentarily energizing the motor M.

It is often desirable to operate the machine either under control of the two hand buttons only or under control of the foot-operated switch only, at the option of the setup man, so that the operator cannot operate the machine in any other way. To this end, we provide means for disconnecting and physically removing from the machine the unwanted control switches, as shown in Fig. 10. The foot switch 160 is connected to the control circuit through a four-conductor cable 200 which is removably connected to the control box 202 by means of a four-prong connector 204. Similarly, the push-button switches 154 and 155 are connected to the control circuit through a four-conductor cable 206 connected to the control box 202 by means of a four-prong connector 208. Thus, if the setup man intends that the machine is to be operated either by the foot-operated switch 160 or by the hand switches 154, 155 only, he can simply physically remove the unwanted control means by disconnecting one or the other of the connectors 204, 208.

The safety device in accordance with our invention lends itself to operation completely submerged in oil, particularly when the machine is controlled electrically. Thus, a sealed oil-filled container 210 is provided for housing the disconnect device 50, the solenoids 142 and 82 and the various linkage mechanisms described. An oil seal 212 is provided for the reciprocating operating rod 38. The oil seal 212 is held in place by a compression spring 214 seated against the guide member 58. A tension spring 216 is provided in order to counteract the weight of the parts secured to the rod portion 52 to return those parts to the position shown in Fig. 4 after each clutch tripping operation. The spring 216 may suitably be connected at one end to the top of the container 210 or to the machine frame and at the other end to a hook 218 carried by the arm 66 of the coupling 56 (Fig. 5).

The operation of the disconnect device 50 will now be described with particular reference to Figs. 4 and 5. With the solenoid 82 deenergized, the linkage mechanism connecting the armature 80 thereof to the ball locking cage 60 will be in the position shown in Fig. 4 to maintain the locking sleeve 60 in a position wherein the locking balls 121 are free to move out of the ball receiving groove 114 in the coupling 154. Operation of the foot treadle 20 (Fig. 1) or of the solenoid 142 (Fig. 8) will result in downward displacement of the rod portion 52 and of the coupling 56 secured thereto. The ball cage 118 and the locking sleeve 60 will also be moved downwardly with the coupling 56, and the locking balls 121 will move out of the groove 114 and pass along the cylindrical sleeve portion 112 of the coupling 54. It will be noted that the pin and slot connection 75, 76 between the locking sleeve actuating clevis member 64 and the bell crank 70 will permit the locking sleeve 60 to follow the ball cage 118. It will thus be seen that downward displacement of the rod portion 52 will not be transmitted to the rod portion 38 as long as the solenoid 82 is deenergized and the actuating rod 52 is, therefore, effectively disconnected from the clutch operating mechanism of the machine with which it is used.

When the solenoid 82 is energized, the armature 80 will be displaced to the position shown in Fig. 5 and will cause the locking sleeve 60 to be displaced upwardly to its ball locking position wherein the narrow bore portion 123 thereof forces the locking balls 121 into the groove 114. It will be seen that with the parts of the disconnect device 50 in the positions shown in Fig. 5, the locking balls 121 will form a rigid connection between the grooved cylindrical sleeve 112 of the coupling 54 and the cylindrical ball cage 118 of the coupling member 116. Downward displacement of rod portion 52 will, therefore, be transmitted to the rod portion 38 to trip and engage the clutch of the power machine. It should be here be noted that if the solenoid 82 should be deenergized while the rod portion 52 is held down, the locking sleeve 60 will be displaced to its non-locking position and the disconnect device will immediately release the locking balls 121 to disconnect the rod portions 52 and 38. Momentary deenergization of the solenoid 82 will, therefore, immediately cause the rod portions 38 and 52 to become disconnected, and subsequent energization of the solenoid 82 will not reengage the rod portions 38 and 52 until the rod portion 52 is released and permitted to assume the position shown in Fig. 4.

Bearing in mind the above-described operation of the disconnect device 50, the operation of the system shown in Figs. 1, 2, 3, 6, 7 and 9 will now be described. When the power machine is in its initial position at rest, the parts will be in the positions shown in Figs. 1 and 3, that is, with the clutch pin 16 maintained out of contact with the rotating flywheel 90 by the clutch lever 24 which is disposed in the recess 94 in the clutch pin. The non-repeat switch 102 and the control switches 132, 133 and 134 (Fig. 7) are assumed to be closed, but the control solenoid 82 for the disconnect device 50 is deenergized (Fig. 4) because of the open contacts of the push button switches 128 and 130. When now the operator desires the machine to go through one cycle of operation, he depresses the push button switch 128 with his left hand and the push button switch 130 with his right hand. This will complete the circuit and energize the solenoid 82 to lock the disconnect device 50. When the operator now depresses foot treadle 20, the rod portions 52 and 38 will be displaced downwardly through the rigid connection therebetween provided by the locked disconnect device 50 to pull clutch lever 24 downwardly out of the recess 94 in the clutch pin 16. The clutch pin 16 is now free to move to the right as viewed in Fig. 3, and the biasing spring 19 will press the pin against the face of the rotating flywheel 90. When the recess 92 in the flywheel 90 registers with the pin 16, the latter will drop into the recess to establish a rigid connection between the flywheel and the clutch drum 12. The crank shaft 10 to which the clutch drum 12 is keyed will now be rotated by the flywheel to cause the ram (not shown) operated thereby to descend into working engagement with the bed plate (not shown) of the machine. The cam 100 secured to the end of the crank shaft 10 will permit the follower 103 (Fig. 7) to move downwardly to open the non-repeat switch 102 during the return stroke of the machine. This will momentarily disconnect the solenoid 82 from the power source 126 to cause the solenoid to release the disconnect device 50 in the manner described above. As the crank shaft completes its cycle of revolution, the clutch lever 24 will drop into the recess 94 of the clutch pin 16 (Fig. 2) and will cam the clutch pin to the left as viewed in Figs. 2 and 3 to again move it out of engagement with the flywheel 90. A conventional braking arrangement (not shown) is provided for causing the crank shaft 10 to come to rest in the position shown in Fig. 1. It is here pointed out that continued depression of the treadle 20 will not cause a repeat operation because the momentary opening of the non-repeat switch 102 causes the disconnect device 50 to release and subsequent energization of the solenoid 82 will not lock the disconnect device 50 until the rod portion 52 has been released.

If the power machine is in its position of rest as shown in Fig. 1 and with the power shut off so that the flywheel 90 is at a standstill, the recess 92 in the flywheel might happen to be in registry with the clutch pin 16. If the device were not provided with the disconnect 50 in accordance with the invention, the operator might inadvertently engage the clutch by depressing the foot treadle 20 either accidentally or without being aware that the power is shut off. If now the operator turns on the power for the machine, the machine will go through one cycle of operation. This has in the past often been the cause of serious accidents because the operator may place one hand on the bed plate of the machine while he is closing the power switch. This cause of inadvertent operation of the machine is completely eliminated in accordance with the present invention by providing the disconnect device 50 and means for locking the disconnect device only when the power of the machine is turned on. If the power should be turned on while the foot treadle is held in depressed position, the solenoid 82 will be unable to engage the disconnect device 50 as above pointed out. Therefore, there is no way the clutch lever 24 can be moved out of engagement with the clutch pin 16 to inadvertently connect the crank shaft 10 to the flywheel 90 as long as the power to the machine is shut off. It should also be noted that if the treadle 20 is locked down, which is usually done in order to secure continuous operation, or if the treadle should be prevented from returning to its initial position by tools or materials resting thereon, this will not cause inadvertent release of the clutch pin 16. It is an important feature of our invention that the safety device comprising the disconnect device 50 and the solenoid 82 will fail safe; that is, if for some reason the power machine is not in operating condition or if a fault develops in the circuit, the crank shaft cannot under any circumstances be connected to the flywheel 90.

The circuit shown in Fig. 7 is provided with a double-pole, single-throw switch 135 which, when closed, will short out both the non-repeat switch 102 and the push button switches 128 and 130 to permit the machine to operate continuously.

Operators often dislike any restrictions on their freedom of actions and, therefore, often attempt to disable safety devices of the type described above. One way of "cheating" the safety device described above would be to tie down or jam one of the push buttons 128 and 130 in place, thereby permitting the machine to be operated under the control of a single push button and a foot treadle. Fig. 9 discloses an arrangement in accordance with a further feature of the invention wherein the clutch operating mechanism will be disabled whenever an operator fails to operate both push buttons 154 and 155 within a predetermined period of time. The selector arm 153 of the selector 152 is placed in contact position 1 for hand operation. When the push buttons 154 and 155 are depressed almost simultaneously, a circuit will be established from the line terminal 150 through the switch 149, the selector arm 153, the contacts 165 and 166 of the respective push buttons to the terminal 178 and the armature 168 of the relay 170. The operated push button switches 154 and 155 will also complete the energizing circuit for the solenoid 82, which circuit can be traced from the line terminal 150 through the closed non-repeat switch 102, contacts 162 and 163 of the push button switches 154 and 155, respectively, the solenoid 82, and the return lead 164 to the other line terminal 151. Energization of the solenoid 82 will lock the disconnect device 50.

The operation of the solenoid 142 will be delayed because of the RC time delay circuit comprising the capacitor 176 and the resistor 177 which is connected across the winding of the relay 170. When the capacitor 176 is charged, through the resistances 177 and 180 and rectifier 182, up to a voltage sufficient to operate the relay 170, the latter will move the armature 168 against the front contact 172 and energize the clutch operating relay 142, which will initiate a cycle of operation of the machine. Even if the push buttons 154 and 155 should be held down until the machine completes its cycle, the non-repeat switch 102 will release the disconnect device 50 by momentarily interrupting the energizing circuit for the ball cage operating solenoid 82 as described above. Continued depression of the hand buttons 154 and 155 will therefore not result in a second cycle of operation. If the operator should lock one of the push button switches 154 and 155 in closed position in an attempt to operate the machine by a single push button switch, a circuit will be closed through one or the other of the parallel connected contacts 165 and 166, depending on which the push buttons is locked, to establish a circuit from the line terminal 150 through the switch 149, the selector arm 153 and the contact of the selector switch 152, to the terminal 178 of the relay 170. The relay 170 will not immediately operate because of the RC circuit comprising the condenser 176 and the resistance 177 referred to above. The condenser 176 will be charged through the current limiting resistances 177 and 180 and the rectifier 182, and after a predetermined time delay, depending on the impedance values of the capacitor and resistances, a voltage will be applied across the relay 170 sufficient to cause it to operate to move the armature 168 against the front contact 172 to energize the solenoid 142. The relay 170 will remain energized and the solenoid 142 will thus remain deenergized as long as one of the push buttons 154 and 155 is kept closed. As above noted, the solenoid 82 is incapable of locking the disconnect device 50 while the rod portion 52 is maintained depressed as by the solenoid 142. The circuit will not be put in operative condition until both push buttons 154 and 155 are released to permit the relay 170 to become deenergized, and hence permit the armature 168 to move away from the front contact 172 to deenergize the solenoid 142 and place the circuit under the control of the push buttons. This construction is also advantageous in that it causes the operating circuit to fail safe in the event that one of the push button switches 154 and 155 should become defective and remain closed even after the operator has released the operating button therefor.

In order to provide continuous operation, the switch arm 153 of the selector 152 is moved to the contact position 2, and the continuous run switch 184 is closed. The operating solenoid 82 for the disconnect device 50 will be energized through a circuit which may be traced from the line terminal 150 through the switch 149, the contact arm 153 of the selector 152, one blade 183 of the switch 184, the contact 186, the safety switches 188 and 189, the solenoid 82, and the return line 164 to the other line to lock the disconnect device 50. The solenoid 142 will be energized through a circuit which may be traced from the line terminal 150 to the armature 168 of the relay 170, and after a short time delay until the relay operates as described above, through the front contact 172, the solenoid 142, the return lead 164 to the other line terminal 151 to depress the operating rod 52. The non-repeat switch 102 is by-passed and will have no control over the solenoid 82 and the machine will continue to operate until one of the circuit switches mentioned is opened.

For operation under the control of the foot pedal operated switch 160, the switch arm 153 of the selector 152 is moved to the contact position 3. When the foot treadle 192 is depressed, switch 160 will be closed and the solenoid 82 will be energized through a circuit which can be traced from the line terminal 150 through the main switch 149, the non-repeat switch 102, the contact 190 of the switch 160 and the solenoid 82 to the return lead 164. The solenoid 142 will be energized through the circuit traced above. With both solenoids 82 and 142 energized in the proper sequence, the machine will go through one cycle of operation as described. The non-repeat switch 102 is opened by the cam 100 as explained above to cause single cycle operation.

It will thus be seen that the solenoids 142 and 82 are energized when both push buttons 154 and 155 are depressed substantially simultaneously with the selector 152 in contact position 1, and when the foot treadle 192 is depressed with the selector in contact position 3. The solenoid 82 will in both instances operate slightly before the solenoid 142 because of the delay in operating the relay 170, thus assuring that the disconnect device 50 is locked before the operating rod 52 is depressed by the solenoid 142.

In the embodiment shown in Fig. 9 the control switches 188 and 189 are included only in the circuit for operating the machine continuously under the control of the switch 184, but it is clear that the control switches can also be included in the circuits for single-cycle operation of the machine.

Under certain circumstances, it is desirable to operate the machine continuously by tying down the foot-operated switch 160 instead of providing the hand-operated switch 184. The circuit for accomplishing this result is established with the selector arm 153 in contact position 4 wherein it will engage both contacts 4a and 4b. The switch 160 may be locked down in any suitable manner, such as by means of a pivoted latch 220, for example. It will be apparent that the operating circuit for the solenoids 82 and 142 will be substantially the same as with the selector arm 153 in contact position 3 except that contact 4a will shunt out the non-repeat switch 102 so that the machine will continue to operate until the foot treadle is released.

Although only specific embodiments of the invention have been described herein, it will be apparent to those skilled in the art that various changes and modifications may be made without departing from the true scope of the invention.

We claim:

1. In a power machine having work performing driven means, driving means including an electric motor, an energizing circuit for said motor, clutch means connecting said driving and driven means, means for engaging said clutch means, and electrically operated means for actuating said clutch engaging means, a safety device comprising disconnect means connecting said clutch engaging means and said clutch actuating means, electrically operable means for locking said disconnect device when energized and for releasing said disconnect device when deenergized, switch means for electrically connecting said locking means to said energizing circuit, switch means operable with said first named switch means for energizing said clutch actuating means, and time delay circuit means in circuit with said clutch actuating means to delay the operation of the latter for a period of time sufficient to permit said locking means to operate.

2. In a power machine having work performing driven means, driving means including an electric motor, an energizing circuit for said motor, clutch means connecting said driving and driven means, means for engaging said clutch means and electrically operated means for actuating said clutch engaging means, a safety device comprising disconnect means connecting said clutch engaging means and said clutch actuating means, electrically operable means for locking said disconnect device when energized and for releasing said disconnect device when deenergized, switch means for electrically connecting said locking means to said energizing circuit, switch means operable with said first named switch means for energizing said clutch actuating means, and time delay circuit means including a resistance-capacitance network in circuit with said clutch actuating means to delay the operation of the latter for a period of time sufficient to permit said locking means to operate.

3. In a power machine having work performing portions including a rotatable driven member, drive means including an electric motor, an energizing circuit for said motor, clutch means including a clutch engaging trip member for engaging said clutch means for drivably connecting said drive means to said driven member, electrically operated actuating means, and link means including a control rod operably connecting said actuating means and said clutch trip means, a safety device comprising a disconnect device including a pair of relatively movable members and electrically operated locking means for selectively locking said last named members together when energized, means for rigidly mounting said disconnect members to respective adjacent rod portions at a break in said operating rod, and a pair of double-pole single-throw push button switches, one set of contacts of each of said switches being connected in series for electrically connecting said locking means to said energizing circuit for the motor and the other set of contacts of said switches being connected in parallel for connecting said actuating means to said energizing circuit.

4. In a power machine having work performing portions including a rotatable driven member, drive means including an electric motor, an energizing circuit for said motor, clutch means including a clutch engaging trip member for engaging said clutch means for drivably connecting said drive means to said driven means, electrically operated actuating means, and link means including a control rod operably connecting said actuating means and said clutch trip means, a safety device comprising a disconnect device including a pair of relatively movable members and electrically operated locking means for selectively locking said last named members together when energized, means for rigidly mounting said disconnect members to respective adjacent rod portions at a break in said operating rod, normally open switch for electrically connecting said actuating means to said energizing circuit, electromagnetic means for closing said switch when energized, manually operable switch means for electrically connecting said actuating means and said electromagnetic means to said energizing circuit, and means for delaying the energization of said electromagnetic means until said locking means has operated.

5. In a power machine having work performing portions including a rotatable driven member, drive means including an electric motor, an energizing circuit for said motor, single cycle clutch means including a clutch engaging trip member for engaging said clutch means for drivably connecting said drive means to said driven means, an operator controlled actuating member, and link means including a control rod operably connecting said actuating member and said clutch trip means, a safety device including a disconnect device, said disconnect device comprising a pair of relatively movable members and electrically operated locking means for selectively locking said last named members together when energized, means for rigidly securing said disconnect members to respective adjacent rod portions at a break in said operating rod, means for electrically connecting said locking means to said energizing circuit for said motor, normally closed non-repeat switch means in circuit with said locking means, and means operable with said driven member for momentarily opening said switch during a cycle of operation of the machine to release said disconnect means.

6. In a power machine having work performing portions including a rotatable driven member, drive means including an electric motor, an energizing circuit for said motor clutch means including a clutch engaging trip member for engaging said clutch means for drivably connecting said drive means to said driven means, an operator controlled atcuating member, and link means including a control rod operably connecting said actuating member and said clutch trip means, a safety device including a disconnect device, said disconnect device including a pair of telescoping members, the inner of said members having a cylindrical shank portion provided with a peripheral ball receiving groove, the other of said members being in the form of a cylindrical sleeve having a plurality of circular ball retaining openings therein disposed about the circumference of the sleeve, means for rigidly mounting said telescoping members to respective adjacent rod portions at a break in said operating rod with the ball receiving groove and apertures of said respective members in juxtaposed relation, a locking sleeve slidably mounted on said ball retaining sleeve, said locking sleeve having an internal expanded portion, balls in the ball retaining openings of said ball retaining sleeve, said locking sleeve having a locking position wherein the internal surface thereof engages the balls to press them into the groove of said one of said members and a releasing position wherein the balls are permitted to enter the expanded portion of the locking sleeve out of engagement with the groove, electromagnetic actuating means including a movable armature, linkage mechanism connecting said armature and said locking sleeve to displace said locking sleeve to locking position when said electromagnetic means is energized and to displace said locking sleeve to non-locking position when said electromagnetic means is deenergized, and means for electrically connecting said electromagnetic means to said energizing circuit for said motor whereby said disconnect device disables said clutch operating mechanism when said motor is deenergized.

7. In a power machine having work performing portions including a rotatable driven member, drive means including an electric motor, an energizing circuit clutch means including a clutch engaging trip member for engaging said clutch means for drivably connecting said drive means to said driven means, an operator controlled actuating member, and connecting link means operably connecting said actuating member and said clutch trip means, a safety device including a disconnect device, said disconnect device icluding a pair of telescopng members, the inner of sad members having a cylindrical shank portion provided with a peripheral ball receiving groove, the other of said members being in the form of a cylindrical sleeve having a plurality of circular ball retaining openings therein disposed about the circumference of the sleeve, means for rigidly mounting said telescoping members to respective adjacent portions at a break in said link with the ball receiving groove and apertures of said respective members in juxtaposed relation, a locking sleeve slidably mounted on said ball retaining sleeve, said locking sleeve having an internal expanded portion, balls in the ball retaining openings of said ball retaining sleeve, said locking sleeve having a locking position wherein the internal surface thereof engages the balls to press them into the groove of said one of said members and a releasing position wherein the balls are permitted to enter the expanded portion of the locking sleeve out of engagement with the groove, electromagnetic actuating means including a movable armature, linkage mechanism connecting said armature and said locking sleeve to displace said locking sleeve to locking position when said electromagnetic means is energized and to displace said locking sleeve to non-locking position when said electromagnetic means is deenergized, said linkage mechanism includng a pin and slot connection permitting displacement of said disconnect device with respect to said electromagnetic actuating means with said disconnect device remaining in locked condition, and means including a pair of spaced hand-operated switches for electrically connecting said electromagnetic means to the said energizing circuit for said motor whereby said disconnect device disables said clutch operating mechanism when said motor is deenergized.

8. A safety system for operating a power machine comprising electrically operated means for initiating operation of said machine, an energizing source, disconnect means connected between said initiating means and the machine, electrically operated means for locking said disconnect means when energized to operably connect said initiating means to said machine, said disconnect means including means to prevent said locking means from locking said disconnect device while said initiating means is energized, a pair of spaced push button switches to be operated by respective hands of the operator, each of said switches comprising two sets of electrically independent contacts closed substantially simultaneously when the push button thereof is depressed, one set of contacts being connected in series with said locking means for connecting said locking means to said energizing source to energize said locking means when both of said switches are closed, the other set of contacts of each of said switches being connected in parallel for connecting said initiating means to said energizing source when either switch is closed, and time delay circuit means in circuit with said initiating means for momentarily delaying the operation thereof after one of said switches has been closed.

9. A safety system for operating a power machine comprising electrically operated means for initiating operation of said machine, an energizing source, disconnect means connected between said initiating means and the machine, electrically operated means for locking said disconnect means when energized to operably connect said initiating means to said machine, said disconnect means including means to prevent said locking means from locking said disconnect device while said initiating means is energized, a relay having an armature and associated front contact in series circuit with said initiating means, a pair of spaced push button switches to be operated by respective hands of the operator, each of said switches comprising two sets of electrically independent contacts closed substantially simultaneously when the push button thereof is depressed, one set of contacts being connected in series with said locking means for connecting said locking means to said energizing source to energize said locking means when both of said switches are closed, the other set of contacts of each of said switches being connected in parallel for connecting said armature and the operating winding of said relay to said energizing source when either switch is closed, and time delay circuit means in circuit with said relay delaying the operation thereof until a period of time after one of said push button switches has been closed.

10. In a power machine having work performing driven means, driving means including an electric motor, an energizing circuit for said motor, clutch means connecting said driving and driven means, means for engaging said clutch means and electrically operated means for actuating said clutch engaging means, a safety device comprising disconnect means for connecting said clutch engaging means and said clutch actuating means, electrically operable means for locking said disconnect device when energized and for releasing said disconnect device when deenergized, switch means for electrically connecting said locking means to said energizing circuit for said motor, switch means operable with said first named switch means for energizing said clutch actuating means, non-repeat switch means actuated from said driven means in circuit with said locking means, and time delay circuit means in circuit with said clutch actuating means to delay the operation thereof for a period of time sufficient to permit said locking means to operate.

11. A safety system for operating a power machine comprising electrically operated means for initiating operation of said machine, an energizing source, disconnect means connected between said initiating means and the machine, electrically operated means for locking said disconnect means when energized to operably connect said initiating means to said machine, said disconnect means including means to prevent said locking means from locking said disconnect device while said initiating means is energized, a relay having an armature and associated front contact in series circuit with said initiating means, a pair of spaced push button switches to be operated by respective hands of the operator, each of said switches comprising two sets of electrically independent contacts closed substantially simultaneously when the push button thereof is depressed, one set of contacts of each of said switches being connected in series with said locking means for connecting said locking means to said energizing source to energize said locking means when both of said switches are closed, the other set of contacts of each of said switches being connected in parallel in circuit with said armature and the operating winding of said relay, time delay circuit means in circuit with said relay delaying the operation thereof until a period of time after one of said push button switches has been closed, manually operable continuous-operation switch means in circuit with said initiating means and said locking means, foot operated switch means in circuit with said locking means, said initiating means, and said relay, and selector means settable for connecting selectively said foot operated switch means, said manually operable switch means, and said parallel connected contacts of said push button switches to said source of energization.

12. A safety system for operating a power machine comprising electrically operated means for initiating operation of said machine, an energizing source, disconnect means connected betwen said initiating means and the machine, electrically operated means for locking said disconnect means when energized to operably connect said initiating means to said machine, said disconnect means including means to prevent said locking means from locking said disconnect device while said initiating means is energized, a relay having an armature and associated front contact in series circuit with said initiating means, a pair of spaced push button switches to be operated by respective hands of the operator, each of said switches comprising two sets of electrically independent contacts closed substantially simultaneously when the push button thereof is depressed, one set of contacts of each of said switches being connected in series with said locking means for connecting said locking means to said energizing source to energize said locking means when both of said switches are closed, the other set of contacts of each of said switches being connected in parallel in circuit with said armature and the operating winding of said relay, time delay circuit means in circuit with said relay for delaying the operation thereof until a period of time after one of said push button switches has been closed, a normally closed non-repeat switch operated once during each cycle of operation of said power machine, foot operated switch means including two sets of electrically independent contacts, one of said last-named sets of contacts being connected in circuit with said energizing source, said non-repeat switch and said locking means, and the other set of contacts being connected in circuit with said armature and said relay, latch means for selectively holding said foot operated switch in closed position, and selector means including a plurality of contacts selectively engageable with a wiper arm connected to said source. said wiper having a contact position connecting said parallel connected contacts of said push button switches to said source, a second position connecting said other set of contacts of said foot operated switch to said source and a third position connecting both of said sets of contacts of said foot operated switch to said source.

13. A safety device for power machines having work performing parts, an energizing circuit, a normally continuously operating electric motor connected to and energized from said energizing circuit and including clutch means for connecting said motor to said operating parts, means for engaging said clutch means, and means for actuating said clutch engaging means, comprising disconnect means connecting said clutch engaging means and said actuating means including electrically operated locking means, foot operated switch means for connecting said locking means to said energizing circuit whereby said disconnect device disconnects said actuating means from said clutch engaging means when said motor circuit is deenergized, hand operated switch means including a pair of series connected switches for connecting said locking means to said energizing circuit, and disconnect means for at least one of said foot operated switch means and hand operated switch means for physically disconnecting said at least one switch means from said machine.

References Cited in the file of this patent

UNITED STATES PATENTS

| | | |
|---|---|---|
| 1,630,402 | Monahan | May 31, 1927 |
| 2,199,501 | McBlane | May 7, 1940 |
| 2,275,758 | Harris | Mar. 10, 1942 |
| 2,639,796 | Dean | May 26, 1953 |
| 2,669,686 | Riche | Feb. 16, 1954 |
| 2,701,043 | Scott | Feb. 1, 1955 |
| 2,760,616 | Stratton et al. | Aug. 28, 1956 |

FOREIGN PATENTS

| | | |
|---|---|---|
| 647,508 | France | Jan. 20, 1928 |
| 510,278 | Germany | Oct. 17, 1930 |